US 9,122,431 B2
Sep. 1, 2015

(12) United States Patent
Nakagawa

(10) Patent No.: US 9,122,431 B2
(45) Date of Patent: Sep. 1, 2015

(54) INFORMATION PROCESSING APPARATUS, CONTROL METHOD, AND RECORDING MEDIUM

(71) Applicant: CANON KABUSHIKI KAISHA, Tokyo (JP)

(72) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/753,283

(22) Filed: Jan. 29, 2013

(65) Prior Publication Data

US 2013/0194601 A1  Aug. 1, 2013

(30) Foreign Application Priority Data

Feb. 1, 2012  (JP) ................. 2012-020064

(51) Int. Cl.
*G06F 3/12* (2006.01)

(52) U.S. Cl.
CPC ............ *G06F 3/1254* (2013.01); *G06F 3/1205* (2013.01); *G06F 3/1253* (2013.01); *G06F 3/1285* (2013.01)

(58) Field of Classification Search
CPC .............................. G06K 15/02; G06K 3/1254
USPC ........................................ 358/1.13
See application file for complete search history.

(56) References Cited

U.S. PATENT DOCUMENTS

2005/0223324 A1* 10/2005 Tashiro ................ 715/527
2009/0316180 A1* 12/2009 Nakagawa ............... 358/1.14

FOREIGN PATENT DOCUMENTS

| CN | 1410280 A | 4/2003 |
|---|---|---|
| EP | 2362304 A2 | 8/2011 |
| JP | 2001-130082 A | 5/2001 |
| JP | 04673109 B2 | 4/2011 |
| JP | 2011-233034 A | 11/2011 |
| RU | 2265283 C2 | 11/2005 |
| WO | 2007/083299 A | 7/2007 |
| WO | WO 2011/135792 A1 * | 11/2011 ........... G06F 3/12 |
| WO | WO 2011135792 A1 * | 11/2011 ........... G06F 3/12 |

OTHER PUBLICATIONS

Masashi, Printing System Information Processor and Method Thereof, Nov. 17, 2011, Machine Translated Japanese Patent Publication, JP2011233034, All Pages.*

Hirohiko, Multi-Function Machine Communication Device Control Method of Same and Program for Implementing Method, Oct. 11, 2005, Machine Translated Japanese Patent Publication, JP2005318563, All Pages.*

Bokdeuk Jeong et al., Seamless Windowing for a Future CE Device Running Multiple Operating Systems. International Conference on Consumer Electronics (ICCE) 2012 IEEE.

* cited by examiner

*Primary Examiner* — Ngon Nguyen
(74) *Attorney, Agent, or Firm* — Canon U.S.A., Inc., IP Division

(57) ABSTRACT

Depending on the environment of an operating system, it may be difficult to set print setting information desired by a user, resulting in a decrease in operability for the user. A printer driver activates software that operates in a desktop UI environment, by an additional process which is different from print processing when printing is performed. Accordingly, a print setting screen that can set the print setting information desired by the user is displayed.

16 Claims, 15 Drawing Sheets

FIG. 4A

Printer
Printer Name (N): Printer1 ▶                    Property (P)
                                                Search Printer (D)...

Print Range
● All (A)
○ Current Page (E)        ○ Selected Part (S)
○ Page Designation (G): [            ]
  Designate page numbers by separating with
  commas like 1,3,6, or designate page range
  like 5-12. Designation of pages and sections
  are also available like p1s1,p1s2 or p1s3-p8s3.

Print Target (W): Document Containing Contents ▶
                  of Changes and Comments
Print Designation (R): All Pages ▶

Option (Q)...

Number of Print Copies
Number of Copies (C): 1 ⬍
☑ Print with Collation (T)

Scale
Number of Pages per Sheet (H): 1 Page ▶
Sheet Size Designation (Z): No Designation for ▶
                            Magnification OK          Cancel

INFORMATION PROCESSING APPARATUS, CONTROL METHOD, AND RECORDING MEDIUM

BACKGROUND OF THE INVENTION

1. Field of the Invention

The present invention relates to an information processing apparatus that executes print processing, a control method, and a recording medium.

2. Description of the Related Art

To make detailed print setting, a printer driver has a dedicated user interface (UI). When printing was performed through an application in a conventional print setting processing system, a UI of a printer driver was called using a button, with which a user made detailed setting. The user used the UI (also referred to as setting screen) provided by the printer driver and could set print setting information desired by the user.

Japanese Patent Laid-Open No. 2001-130082 describes that a UI of a printer driver receives setting of printing with binding, in addition to simplex printing or duplex printing.

However, a setting screen of the printer driver may not be displayed unlike Japanese Patent Laid-Open No. 2001-130082, depending on the environment of an operating system. As the result, the user may not set the desirable print setting information.

SUMMARY OF THE INVENTION

The present invention in an aspect provides an information processing apparatus including an activating unit, in case an application which issued a print instruction operates in a first environment, configured to newly activate software that operates in a second environment which is different from the first environment. In case the activating unit newly activates the software, the first environment is changed to the second environment, and a print setting screen for setting print setting information is displayed in the second environment changed from the first environment.

Further features of the present invention will become apparent from the following description of exemplary embodiments with reference to the attached drawings.

BRIEF DESCRIPTION OF THE DRAWINGS

FIG. 4A illustrates an example of a printer dialogue of an application.

DESCRIPTION OF THE EMBODIMENTS

Embodiments optimal for implementing the present invention are described below with reference to the drawings.

Figure 1:
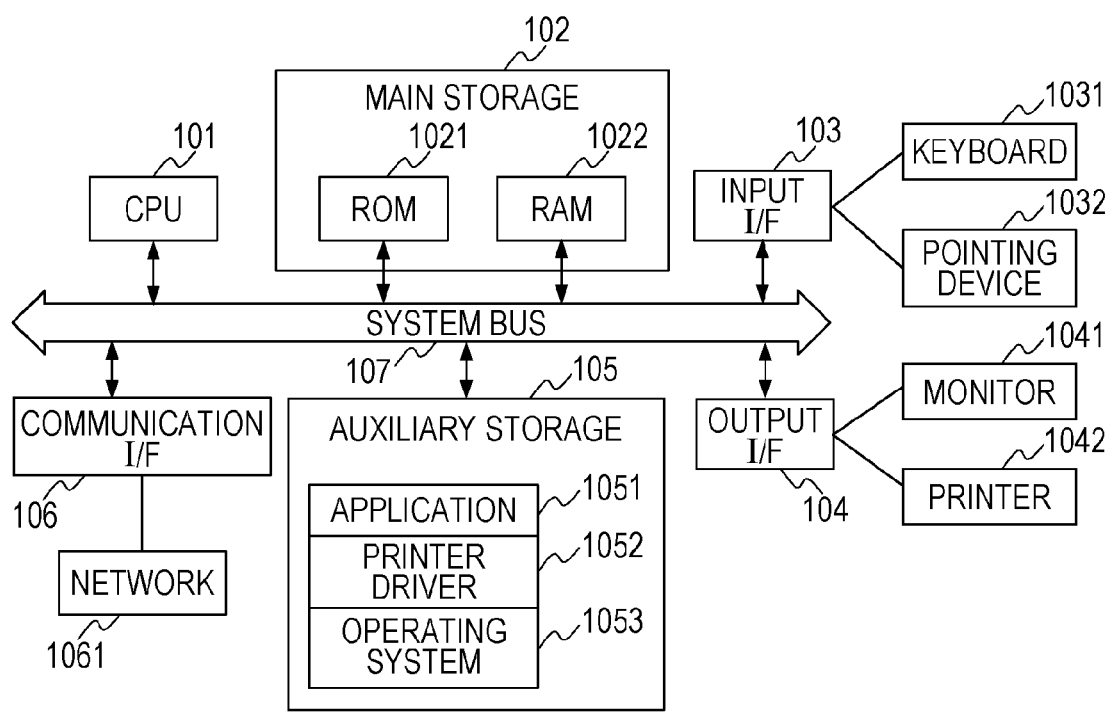
FIG. 1 is a block diagram showing an example of hardware and software of a computer system.

FIG. 1 is a block diagram of an information processing apparatus (also referred to as typical computer or client computer). It is to be noted that the present invention can be applied to a single function, a system including a plurality of devices, or a system that is connected through a network and performs processing, unless otherwise noted, as long as the function of the present invention is executed.

A central processing unit (CPU) 101 controls the entire apparatus in accordance with a program stored in a read-only memory (ROM) 1021 or a random-access memory (RAM) 1022 of a main storage 102, or in an auxiliary storage 105. The RAM 1022 is also used as a work area when the CPU 101 performs various processing. The auxiliary storage 105 stores an operating system 1053, an application 1051, etc. An input device, such as a keyboard 1031, a pointing device 1032 typified by a mouse, or a touch panel, is a device with which a user gives various instructions to a computer through an input interface (I/F) 103. An output I/F 104 is an interface for outputting data to the outside. The output I/F 104 outputs data to an output device, such as a monitor 1041 or a printer 1042. Connection to the printer 1042 may be made not only through a local input/output (I/O) by direct connection, but also through a network 1061 connected via a communication I/F 106. Also, a common data system bus 107 allows transmission and reception of data between I/Fs and modules. The CPU 101 executes processing based on the program stored in the auxiliary storage 105. Hence, a configuration of software of a computer shown in FIG. 2 and processing of respective steps in flowcharts (described later) are realized.

Figure 2:
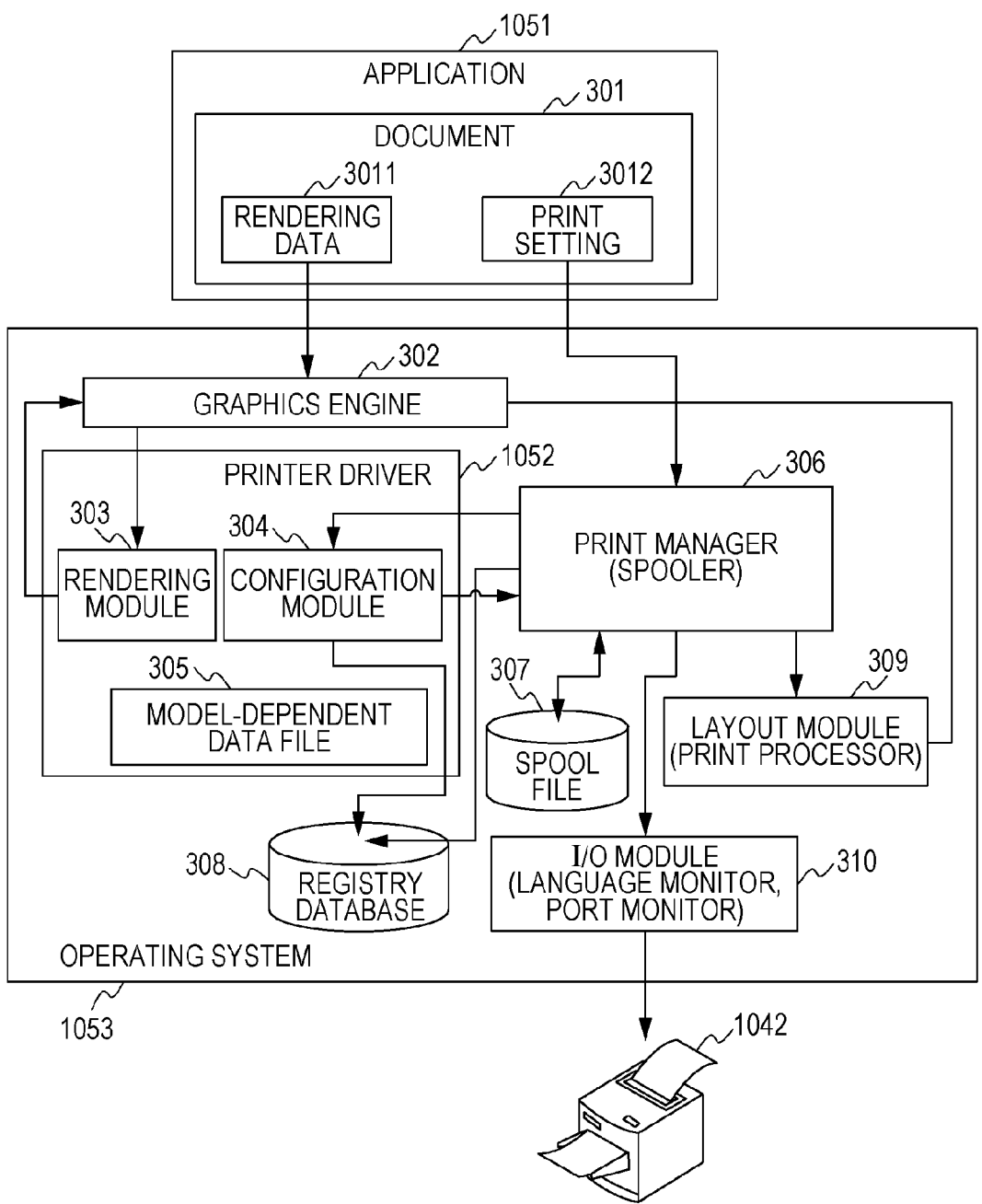
FIG. 2 is a block diagram showing an example of a print processing system with use of a typical computer.

According to FIG. 2 on the auxiliary storage 105 in FIG. 1 the operating system 1053, the application 1051, and a printer driver 1052 are running. A graphics engine 302 and a print manager 306 are additional modules of the operating system 1053. The user uses the input device, such as the keyboard 1031 or the pointing device 1032, such as a mouse, accesses to the application 1051 displayed on the monitor 1041 as an output device, which instructs execution of print processing for a generated document 301. The print processing is executed by successively performing three processing steps including selection of a printer, generation of print setting information, and conversion of rendering data. In view of the selection of the printer, the printer driver 1052 corresponding to the printer 1042 that executes printing, and in more particular the print queue designated to the printer 1042, is selected. After that print setting information 3012 is generated. A configuration module 304 of the printer driver 1052 generates an initial value of the print setting information 3012 of the document. The generated print setting information 3012 according to FIG. 2 can be changed by the user with the application 1051 or a user interface of the printer driver 1052 so that the print setting information 3012 matches a final print result desired by the user. For example, the print setting information 3012 in FIG. 2 is changed to setting in which the sheet size of the print output is changed in combination with a preferred duplex printing and monochrome printing of the print document 301. The configuration module 304 provides the user interface of the printer driver 1052. The print setting information 3012 can be stored in the RAM 1022 within different data representation formats, such as binary data structure or extensible markup language (XML). These formats may vary depending on requirements or settings of the application 1051, the printer driver 1052, or the operating system 1053. The print setting information 3012 is generated every time when a document 301 is printed and therefore former print setting information 3012 are lost. In contrast print setting information 3012 may be desired to be held, such as an optional device configuration of the printer 1042 and UI environment setting by each user, is saved in a registry database 308 of the operating system 1053. A default value of the print setting information 3012 by each user can also be stored by the print manager 306 of the operating system 1053 in the registry database 308. The last step of the print processing is the conversion of the rendering data 3011. After the print setting information 3012 is generated, the application 1051 receives an instruction for execution of print processing from the user, and notifies the operating system 1053 about the print processing. The operating system 1053 performs rendering on the designated printer driver 1052 through the graphics engine 302. If layout processing is designated in the print setting information 3012, before processing is shifted to a rendering module 303 of the printer driver 1052, the printer driver 1052 generates a temporary spool file 307 through the print manager 306. The printer driver 1052 activates a layout module 309. The layout processing is adapted to change the order or arrangement of pages is changed or a plurality of pages of the temporary spool file 307. The layout module 309 changes the layout of the temporary spool file 307 and the temporary spool file 307 is rendered by the printer driver 1052 again. The printer driver 1052, which has received the rendering data 3011, causes the rendering module 303 to convert the rendering data 3011 into a data language that can be recognized by the printer, i.e., a printer control language. At this time in the print processing, the print setting information 3012 is also converted into the printer control language. In many cases, the rendering module 303 and the configuration module 304 may be modules commonly used for a plurality of types of printers 1042. The differences among models may be disclosed in a model-dependent data file 305 and in case the rendering module 303 and the configuration module 304 may use the model-dependent data file 305 during the print processing, respectively. The converted data is successively saved as the temporary spool file 307. The print manager 306 acquires the temporary spool file 307 and further processes the temporary spool file 307 into a print job file. When the printer 1042 may be warmed up and is in a printer-ready state, the print manager 306 successively transmits print data to the printer 1042 through an I/O module 310. In this way, the rendering data issued by the application 1051 and the print data based on the print setting information 3012 are transmitted to the printer 1042, and printing is executed.

Figure 3:
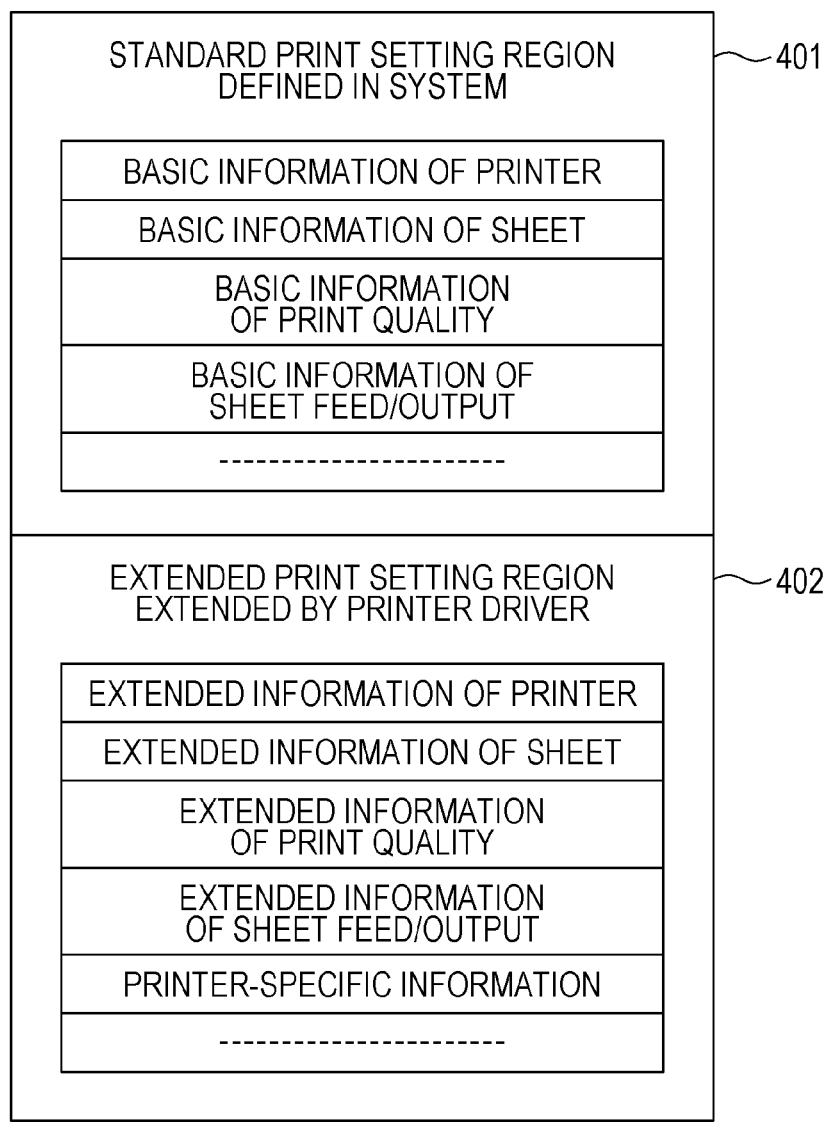
FIG. 3 is a block diagram showing an example of a data structure of the DEVMODE structure for print setting.
Figure 4B:
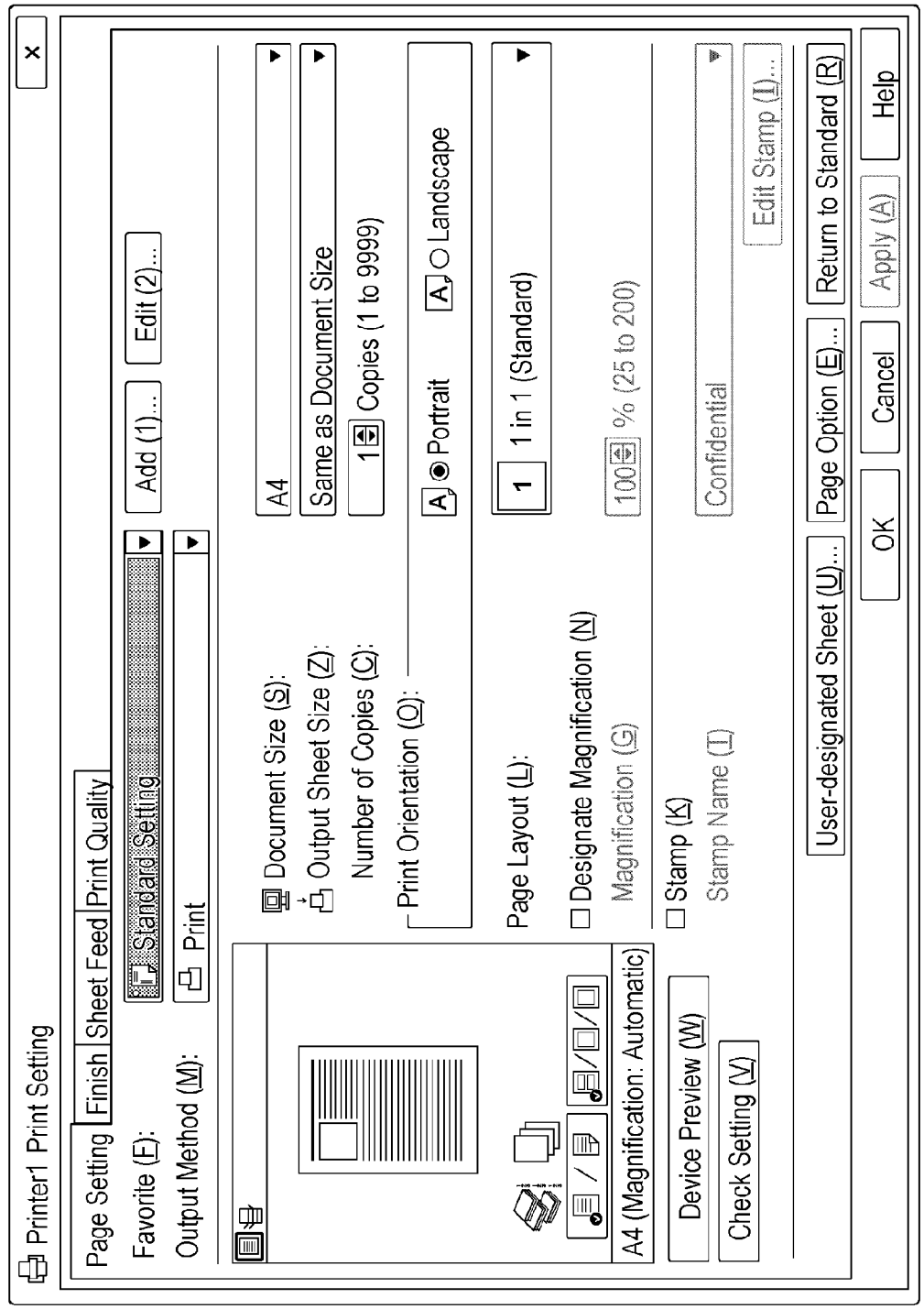
FIG. 4B illustrates an example of a UI of a printer driver according to an embodiment of the present invention.
Figure 10:
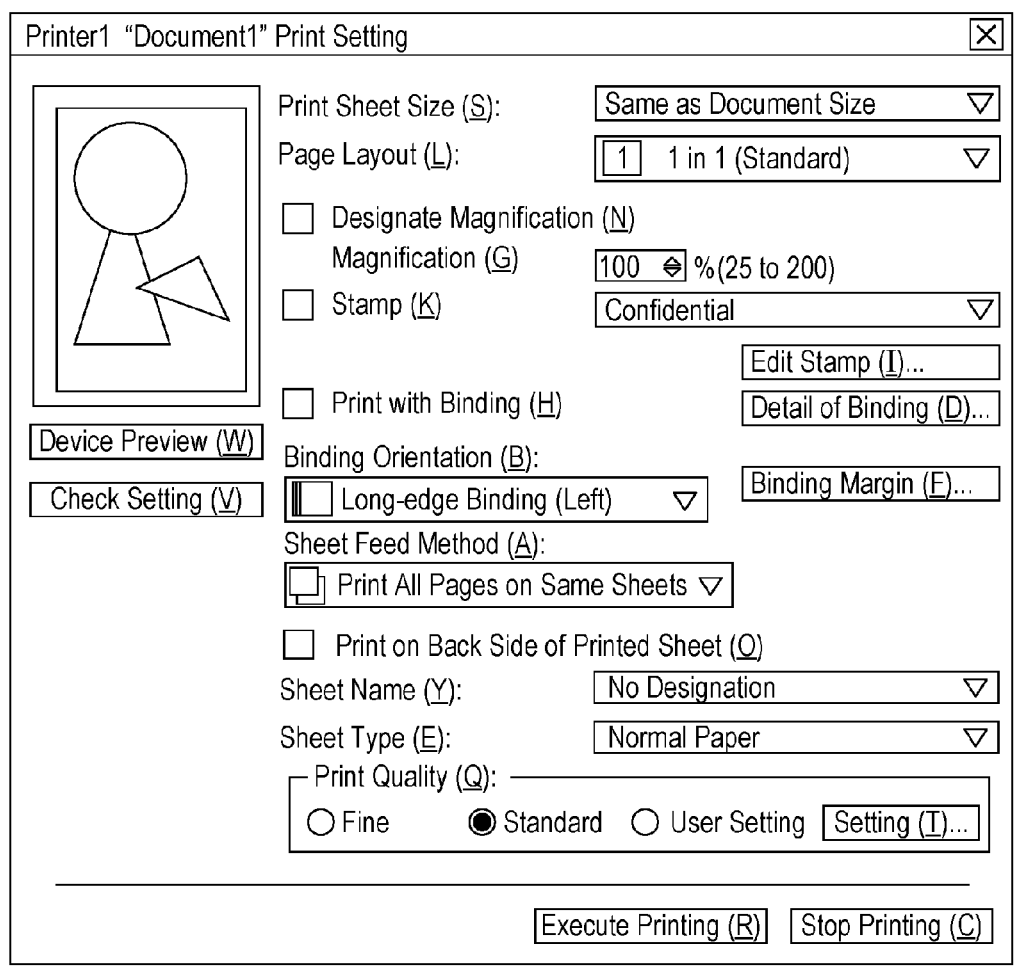
FIG. 10 illustrates an example of a print setting screen activated during processing of the process according to an embodiment of the present invention.

To generate the print setting information 3012 of the document 301, the print setting information 3012 is directly rewritten by the application 1051, or a UI (FIG. 4B) provided by the configuration module 304 of the printer driver 1052 is used. A print setting screen in FIG. 4B is displayed when "Property" button is selected on a screen in FIG. 4A provided by an application that operates in a desktop UI environment (described later). Also, if "Edit+Preview" is selected for the output method in FIG. 4B, a print setting screen in FIG. 10 is displayed (described later). The print setting information 3012 has a structure in FIG. 3 called the DEVMODE structure in the operating system of the Microsoft® (registered trademark) Windows® (registered trademark). The DEVMODE structure is divided into a standard print setting region 401 publicly defined in the operating system 1053, and an extended print setting region 402 extended by the printer driver 1052. The standard print setting region 401 has basic setting values for printing, such as switching of the sheet size or the sheet feed cassette, and switching between color and monochrome. The extended print setting region 402 has values of, for example, a sheet output function corresponding to an option of the printer and a fine color-adjustment function. The application 1051 cannot check the extended setting of each printer driver 1052. Hence, the application 1051 can only directly re-write the print setting in the standard print setting region 401 defined by the system. Owing to this, the application 1051 typically causes a UI of the printer driver 1052 to be displayed simultaneously, and the user is allowed to make setting changes in the extended print setting region 402 by assessing directly the UI of the printer driver 1052. The configuration module 304 of the printer driver 1052 provides not only the UI of the printer driver 1052, but also an application programming interface (API) for possible communication with other applications. Because of that the extended print setting region 402 may be set also via the API from another application without displaying the UI of the printer driver 1052. However, if the API of the configuration module 304 is used, the application 1051 has to correspond to each printer driver 1052, and hence a typical application 1051 changes only the standard print setting region 401, which are normally used by all printer drivers 1052.

Figure 5:
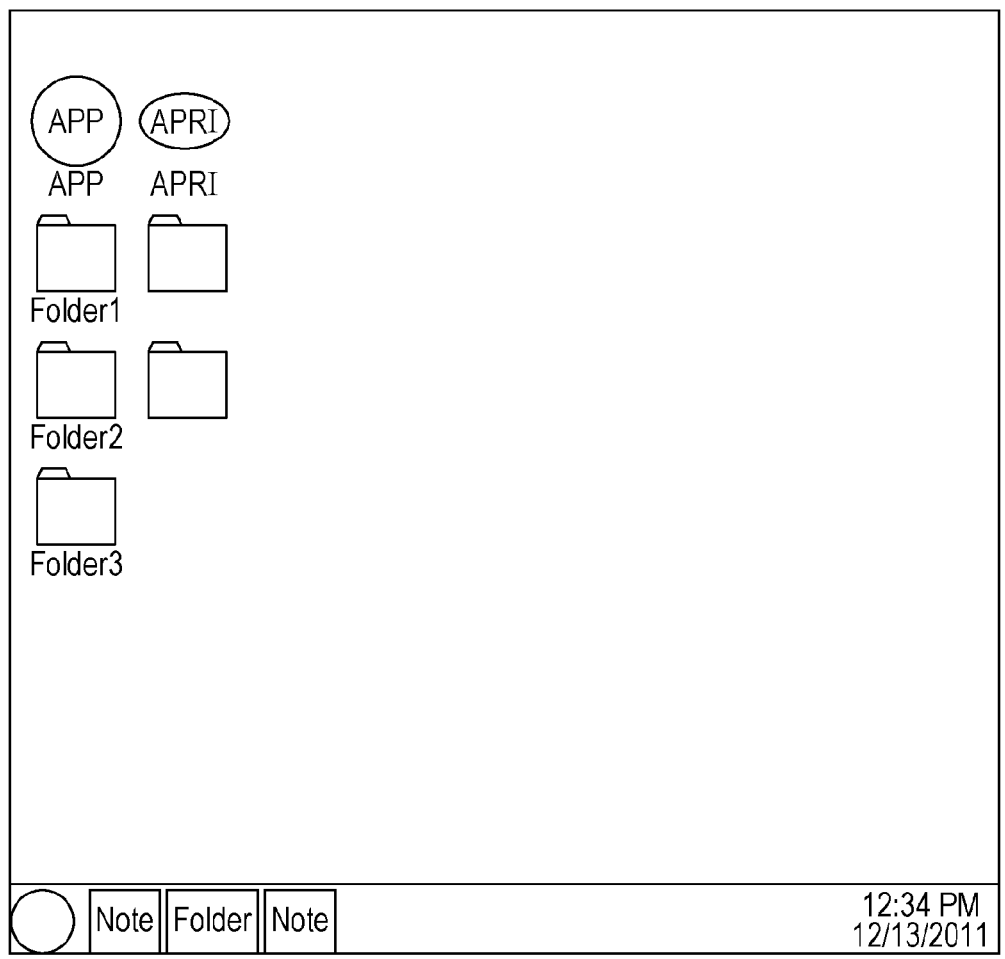
FIG. 5 illustrates an example of a conventional UI environment.
Figure 6:
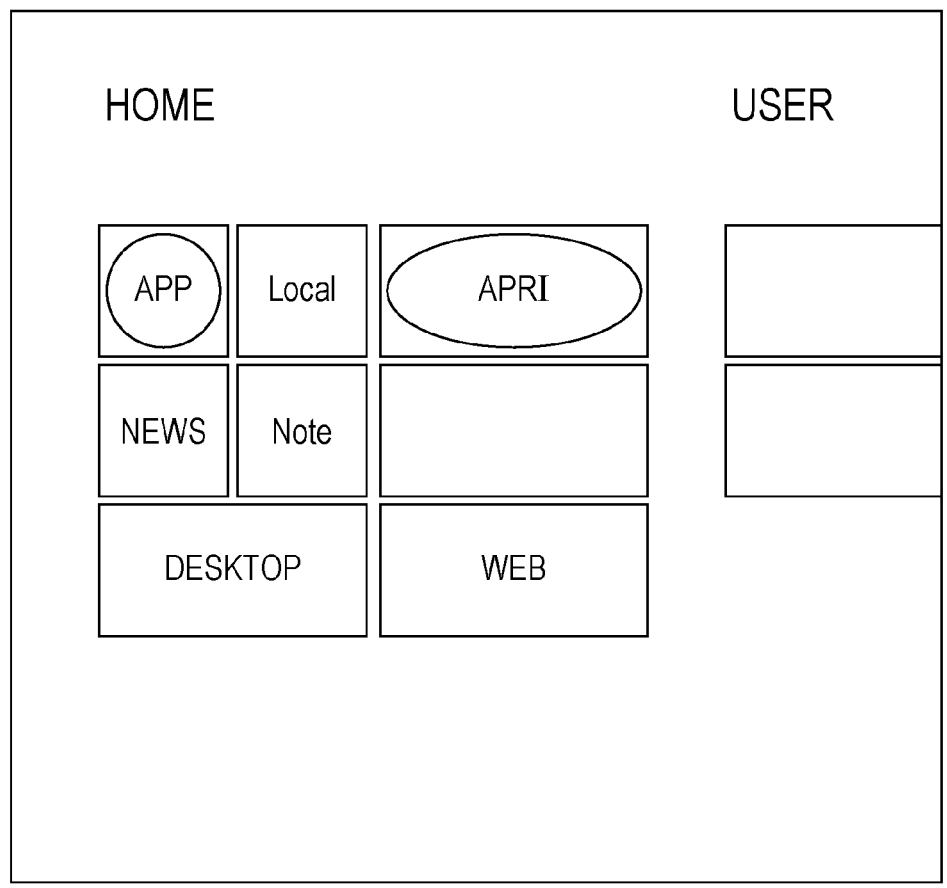
FIG. 6 illustrates an example of a UI environment optimal for a touch panel.

In recent years, because of the advent of mobile devices, such as a mobile phone tablets or laptops with touch functionalities, these mobile devices merely comprise a touch panel with a small screen. Hence, the operating system comprises a conventional UI environment (desktop UI environment) and an additional UI environment suitable for a touch panel (touch-panel UI environment). FIG. 5 illustrates an example of a UI provided in the conventional UI environment of the operating system 1053. FIG. 6 illustrates an example of a UI provided in the UI environment suitable for the touch panel. In other words, FIG. 5 illustrates a UI environment suitable for operation with a mouse etc. It can be said that the UI environment in FIG. 5 is used in combination with older operating systems than the touch-panel UI environment in FIG. 6. It is to be noted that a screen provided in the conventional UI environment is hereinafter called desktop UI. In contrast, a screen provided in the UI environment suitable for the touch panel is hereinafter called touch-panel UI.

The UI environment optimal for the touch panel has a button arrangement available for easy touch operation. A method of providing the UI in the desktop UI environment differs from a method of providing the UI in the touch-panel UI environment. For example, in the touch-panel UI environment, even when a plurality of applications are active, an application to be displayed is limited to one. The UI of only one application is displayed on the monitor 1041 each. Hence, the UIs of other active applications are not displayed. If the application to be displayed is changed, the UI of the changed application is displayed on the monitor 1041 (FIG. 1). In contrast, in the desktop UI environment, when a plurality of applications are active, the UIs of the plurality of applications can be simultaneously displayed on the monitor 1041. Also, in the desktop UI environment, the data configuration can be displayed with a tree structure. In contrast, in the touch-panel UI environment, the data configuration cannot be displayed with a tree structure.

In particular, there is an operating system 1053 configured such that the UI can be switched between the desktop UI environment and the touch-panel UI environment. To generate an application that operates on such an operating system 1053, different packages have to be prepared respectively for the UIs. The printer driver 1052 installed in the desktop UI environment can be used also in combination with the application for the touch-panel UI environment. Accordingly, the user can make a print instruction from the application for the touch-panel UI environment by using the printer driver 1052 (also called desktop printer driver) generated for the desktop UI environment. For example, in FIG. 7A, the printer driver 1052 for the desktop UI environment is selected from the application for the touch-panel UI environment, and "Print" button is selected for instructing printing. As the result, the printer driver 1052 for the desktop UI environment can generate print data by using rendering data issued from the application for the touch-panel UI environment. The printer driver 1052 is assumed to be a desktop printer driver in the following description unless otherwise noted.

However, if the printer driver 1052 for the desktop UI environment is instructed to display the UI from the application for the touch-panel UI environment, the usability is degraded, because the UI of the printer driver 1052 for the desktop UI environment that presupposes an input with a mouse or a keyboard is excessively detailed for the user who operates the touch panel. Owing to this, the usability is increased such that the UI of the printer driver 1052 for the desktop UI environment is not directly displayed in the touch-panel UI environment, the operating system 1053 generates a UI (801 in FIG. 7A) based on metadata in the XML format, and the UI receives print setting information.

However, with the UI generated based on the metadata in the XML format, the print setting information 3012 that can be received by the UI is limited to specific information. Owing to this, with the UI generated by the operating system, information other than the specific print setting information cannot be set. An example in FIG. 7A includes setting items 802-804 and 806 of "Copies," "Orientation," and "Color Mode." To set the print setting information 3012 more in detail, a "More Settings" link 805 is provided. However, information that can be set on a screen (811 in FIG. 7B) generated by the operating system 1053 as the result of the instruction for "More Settings" is also limited to specific information. In the example in FIG. 7B, only items 813, 814, 815 and 816 including "Duplex Printing," "Collation," "Media Size," and "Input Bin" can be set in addition to the aforementioned items 812 and 817.

As described above, the print setting screen generated by the operating system 1053 with the touch-panel UI allows the print setting information 3012 to be set but not for all the items. For example, setting of printing with binding cannot be received on the screens in FIGS. 7A and 7B. If the user insists on setting the print setting information 3012 for the item that cannot be set in the touch-panel UI environment, the setting can be made by using the UI of the printer driver 1052 in the conventional desktop UI environment. The method is as follows. First, the user switches the UI environment from the touch-panel UI environment to the desktop UI environment. The user selects a printer queue to be output on the screen in the desktop UI environment, and activates the print setting screen of the conventional printer driver 1052 as shown in FIG. 4B. The user changes the print setting information 3012 for a desired item on the activated print setting screen. The user switches from the desktop UI environment to the touch-panel UI environment. The print application 1051 instructs generation of print data by using the printer driver 1052. With the above-described method, the print setting information 3012 can be set for all the items included in the printer driver 1052. However, this method changes default print setting information 3012 of the printer driver 1052. The UI environment has to be switched from the touch-panel UI environment to the desktop UI environment and then the print setting information 3012 has to be changed every time when printing is performed. This is very troublesome work, and the print data may be transmitted to the printer 1042 while the final print setting information 3012 cannot be checked.

First Embodiment

A configuration for addressing the problems is described with reference to flowcharts in FIGS. 8 and 9.

Figure 8:
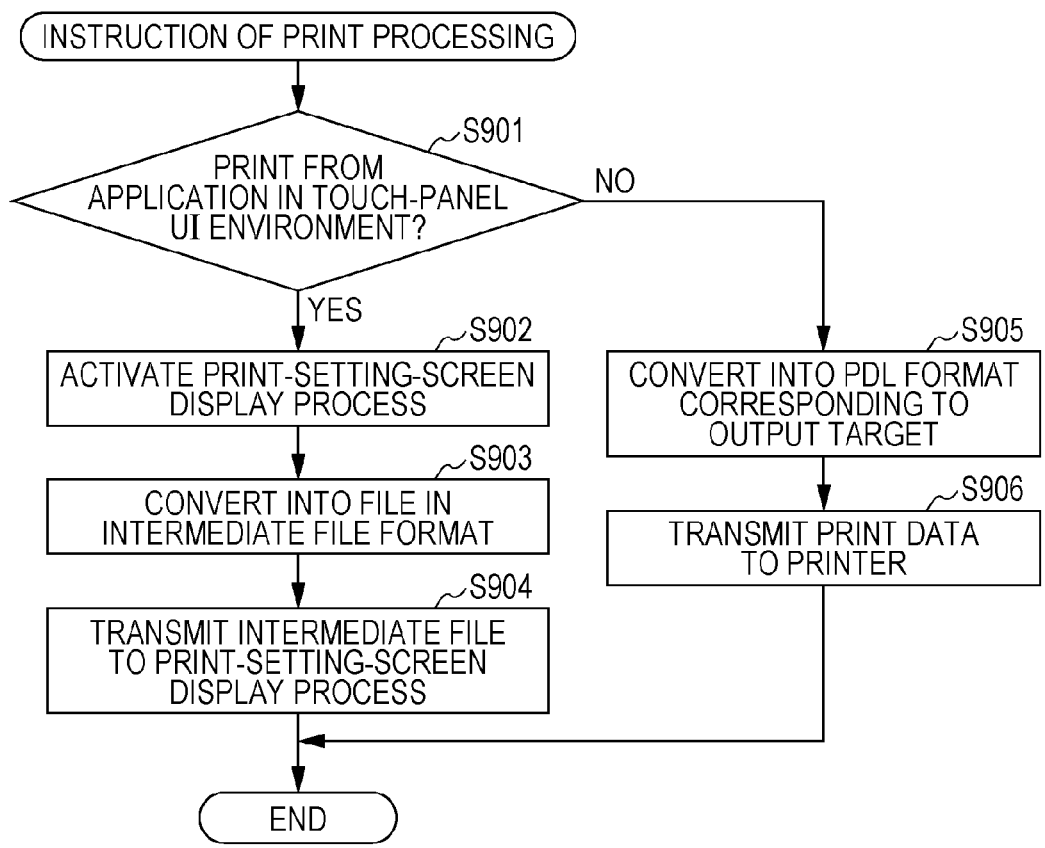
FIG. 8 is a flowchart showing an example of print processing according to a first embodiment of the present invention.
Figure 9:
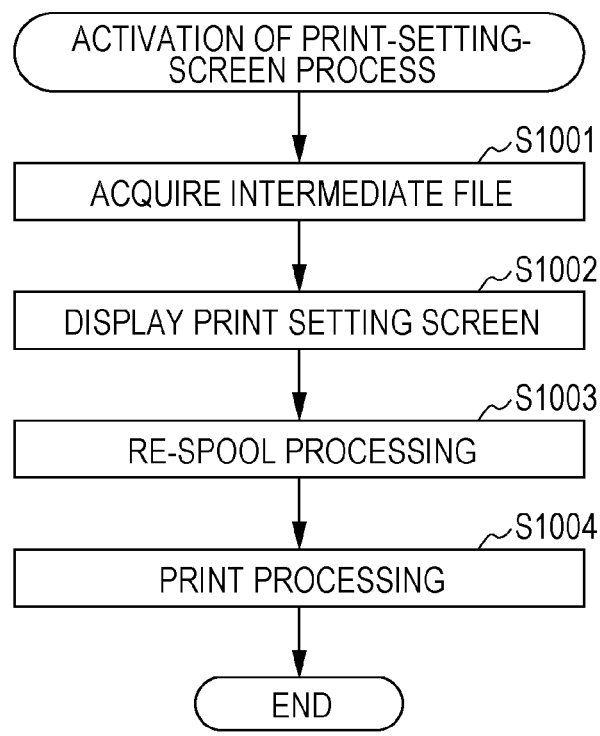
FIG. 9 is a flowchart showing an example of processing activated by the printer driver according to the first embodiment of the present invention.

The flowchart in FIG. 8 relates to processing in which, when the printer driver 1052 for the desktop receives a print instruction from the application 1051 that operates in the touch-panel UI environment, a process different from the printer driver 1052 is activated and a print setting screen in FIG. 10 is displayed in the desktop UI environment. The print setting screen in FIG. 10 is provided by an additional process (desktop module, described later).

This flowchart starts when the printer driver 1052 receives an instruction for execution of print processing from the application 1051. More specifically, the processing starts when "Print" button is pressed in a screen 801 in FIG. 7A.

Figure 7A:
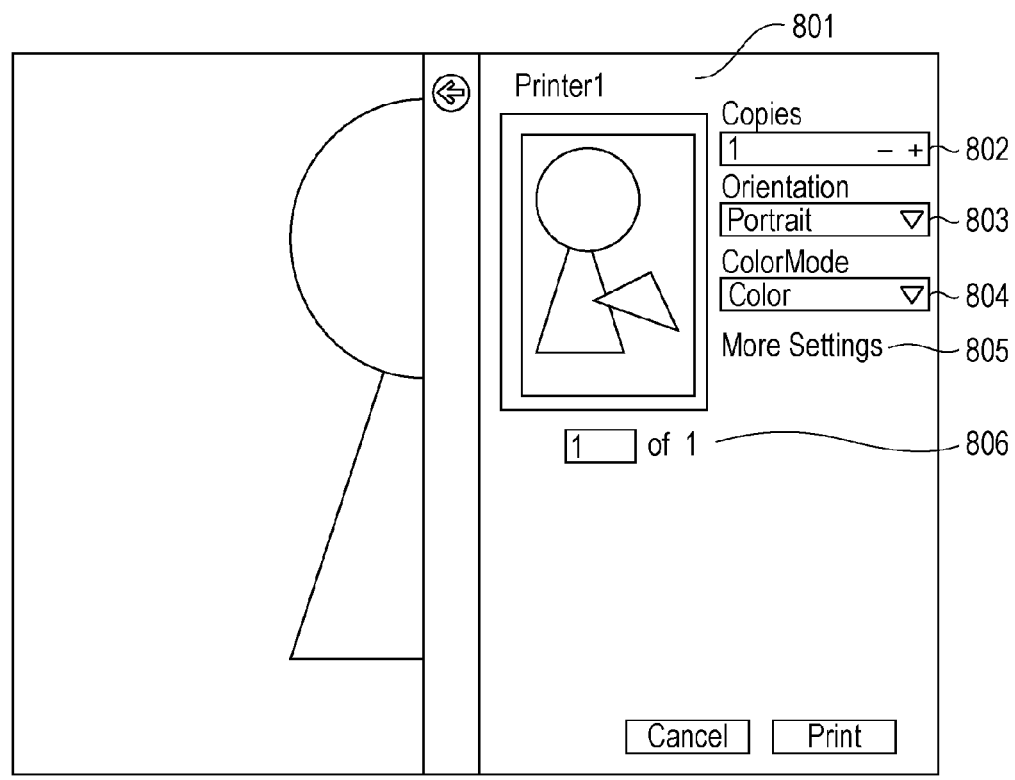
FIG. 7A illustrates an example of a UI for printing from a touch-panel UI application.
Figure 7B:
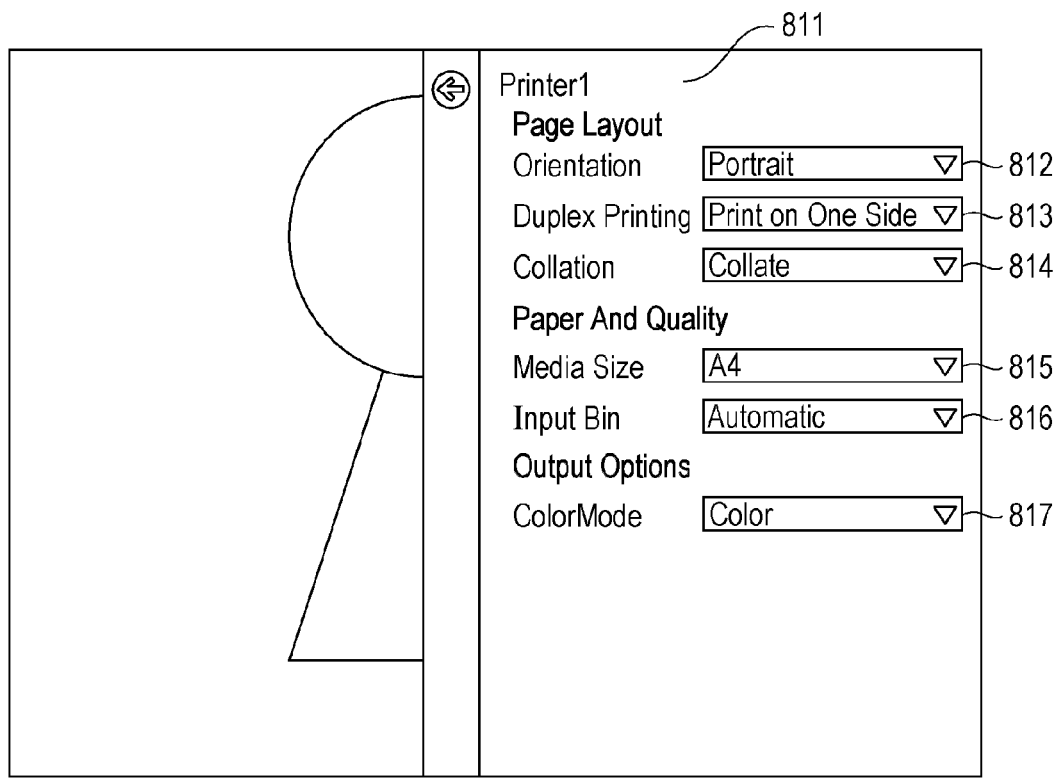
FIG. 7B illustrates an example of a UI displayed when the UI for printing is activated from the touch-panel UI application and further a "More Settings" link on the screen is clicked.

When the printer driver 1052 receives the instruction for execution of print processing from the application 1051, the printer driver 1052 determines whether or not the instruction is printing from the application 1051 that operates in the touch-panel UI environment (step S901). More specifically, the printer driver 1052 compares the name of the application 1051 requesting the printing with the name of the exe file of that application 1051, and if both the names of the applications 1051 are the same, the printer driver 1052 determines that the print instruction is received from the application 1051 that operates in the desktop UI environment. In contrast, if both names of the applications 1051 are different, the printer driver 1052 determines that the print request is received from the application 1051 that operates in the touch-panel UI environment. Also, processing in S903 may be performed by determining whether or not the application 1051 requesting the printing operates on a specific platform of the operating system 1053. More specifically, if it is determined that the application 1051 requesting the printing operates on the specific platform of the operating system 1053, the application 1051 is determined as the application 1051 that operates in the touch-panel UI environment. In contrast, if it is determined that the application 1051 does not operate on the specific platform of the operating system 1053 (i.e., if it is determined that the application 1051 is operated on a platform of the operating system 1053 different from the specific platform of the operating system 1053), the application 1051 is determined as the application 1051 for the desktop UI environment. Therefore, the determined platform of the operating system 1053 provides the touch-panel UI environment and the platform of the operating system 1053 different from the specific platform provides the desktop UI environment. Alternatively, the determination may be made by using the Windows API. As the result of the determination, if the instruction is from the application 1051 that operates in the touch-panel UI environment (YES in step S901), the printer driver 1052 activates a print-setting-screen display process that is the additional process (step S902). The additional process specifically represents a module (also referred to as desktop module) that displays a UI in the desktop UI environment. That is, software that operates in the desktop UI environment may be activated in addition to the process of the print processing. For example, the layout module 309 in FIG. 2 of this application 1051 is the module that operates in the desktop UI environment. Hence, the printer driver 1052 may activate the layout module 309 in addition to the process of the print processing in step S902. When the desktop module is activated, the operating system 1053 automatically switches the UI environment from the touch-panel UI environment to the desktop UI environment, to display the print setting screen in FIG. 10 of the desktop module. The print setting screen in FIG. 10 provided by the desktop module is displayed in the desktop environment switched by the operating system 1053. The print setting screen in FIG. 10 can receive print setting information 3012 for all items that can be set by using the printer driver 1052. Hence, the user can set the print setting information 3012 desired by the user by using this print setting screen. Also, the contents set in FIGS. 7A and 7B are reflected in FIG. 10. For example, the sheet size ("Media Size") is an item common to both FIGS. 7B and 10. The content of the sheet size set in FIG. 7B is reflected in FIG. 10.

Further, the printer driver 1052 converts rendering data received from the application 1051 into a file in an intermediate file format (also referred to as intermediate file) (step S903), and transmits the intermediate file to the activated desktop module (step S904). The intermediate file format may be in the EMF file format or the XPS file format. However, it is not limited thereto. The purpose is to increase the versatility of processing for a later print job. The method of activating the additional process may be the same as the method by which the printer driver 1052 activates the layout module 309.

If the instruction for execution of print processing from the application 1051 is not an instruction from the application 1051 that operates in the touch-panel UI environment (NO in step S901), the printer driver 1052 converts the rendering data 3011 into print data (printer control language) (step S905), and transmits the print data to the output target (S906).

Described next is the processing of the additional process activated from the printer driver 1052 if printing is instructed from the application 1051 that operates in the touch-panel UI environment with reference to the flowchart in FIG. 9.

After the desktop module is activated from the printer driver 1052, the desktop module acquires the intermediate file (step S1001). After the acquiring of the intermediate file, the desktop module displays the print setting screen in FIG. 10 (step S1002). That is, FIG. 10 is displayed when "Property" button in FIG. 4A is pressed as described above or is displayed by the processing in FIG. 9. FIG. 10 illustrates an example of the print setting screen displayed in step S1002. As described above, the print setting screen in FIG. 10 can receive print setting information 3012 for all print setting items that can be set through the printer driver 1052. After the print setting screen in FIG. 10 is displayed and the desktop module receives the finalization of settings of the print setting information 3012 from the user, the desktop module reflects the print setting information 3012 to the intermediate file received from the printer driver 1052, and performs a re-spool processing (step S1003). The desktop module executes print processing (step S1004). More specifically, the desktop module generates a spool file, and notifies the printer driver 1052 about the spool file. After that, the printer driver 1052 generates print data based on the spool file and transmits the print data to the printer 1042. If the print setting screen in FIG. 10 is displayed as the result of that the additional process is activated, for example, when the UI environment is changed from the touch-panel UI environment, the desktop module may display the print setting screen in FIG. 10 in an enlarged manner so that the screen is displayed on the entire monitor for easier reception of a touch operation. That is, the print setting screen in FIG. 10 displayed as the result of that the additional process is activated when the UI environment is changed from the touch-panel UI environment is larger than the print setting screen in FIG. 10 displayed in response to the instruction received in the desktop UI environment. With the above-described processing, even when printing is instructed from the application 1051 in the touch-panel UI environment, there is provided the print setting screen in FIG. 10 that allows print setting information 3012 equivalent to that of the printer driver 1052 to be set. Accordingly, the print setting information 3012 can be set for all the items without an intention of the user. Also, by using this embodiment, the problem, in which the print data is transmitted to the printer 1042 while the final print setting information 3012 cannot be checked, can be also addressed.

Second Embodiment

With the method according to the first embodiment, when printing is performed from the application 1051 that operates in the touch-panel UI environment, the UI environment is always switched to the desktop UI environment and hence the print setting screen in FIG. 10 is displayed. Then, for a user who wants to only change setting items for printing displayed in, for example, FIGS. 7A and 7B, an unnecessary print setting screen may be always displayed every printing.

Figure 11A:
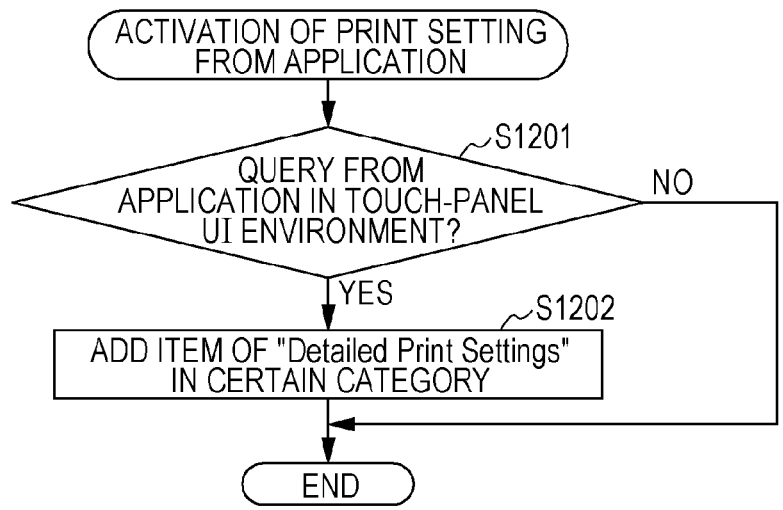
FIG. 11A is a flowchart showing an example of processing for notification of information in response to a query from an operating system according to a second embodiment of the present invention.

A configuration for addressing the problem is described with reference to a flowchart in FIG. 11A.

This flowchart adds and displays an option called "Detailed Print Settings" in a setting item in a print setting screen generated by the operating system 1053, if printing is instructed from the application 1051 that operates in the touch-panel UI environment. The flowchart relates to processing for control to display the print setting screen in FIG. 10 in the desktop UI environment if the user selects "Detailed Print Settings" when the execution of print processing is instructed from the application 1051.

This flowchart starts in response to that the application makes a query for the print setting information 3012 to the printer driver 1052 when the screen 801 in FIG. 7A is displayed.

Figure 12:
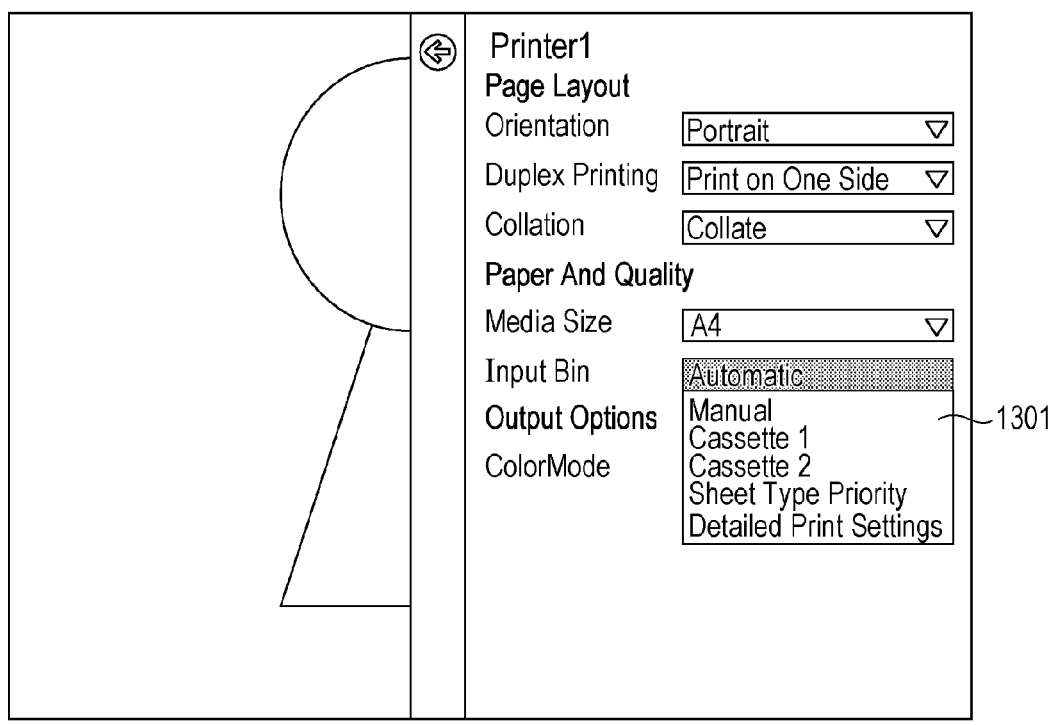
FIG. 12 illustrates an example of a UI for printing from a touch-panel UI application according to the second embodiment of the present invention.

The printer driver 1052 determines whether or not the query for the print setting information 3012 from the application 1051 is a query from the application 1051 that operates in the touch-panel UI environment (step S1201). The query for the print setting information 3012 from the application 1051 represents acquisition of information required for generating the print setting screen called from the application 1051. The application 1051 typically displays the print setting screen by using the API of the operating system 1053. More specifically, the maximum number of "Copies" and presence of support for "Color Mode" are used. Also, for "Media Size"

and "Input Bin," all sheet sizes and sheet feeding methods supported by the printer driver 1052 are listed and the list is notified to the operating system 1053. Hereinafter, "Copies," "Color Mode," "Media Size," "Input Bin," etc., may be also called categories. As the result of the determination, if the query is from the application 1051 that operates in the touch-panel UI environment (YES step S1201), the printer driver 1052 responds to the query by adding the option of "Detailed Print Settings" in a certain category. The certain category represents a list-form category, such as "Media Size" or "Input Bin;" however, it is not limited thereto. FIG. 12 illustrates an example of the print setting screen including the item of "Detailed Print Settings" generated by the operating system 1053. In this embodiment, the option of "Detailed Print Settings" is added as an option in the optional items 1301 of "Input Bin," at a position after "Automatic," "Manual," "Cassette 1," "Cassette 2," and "Paper Type Priority."

Figure 11B:
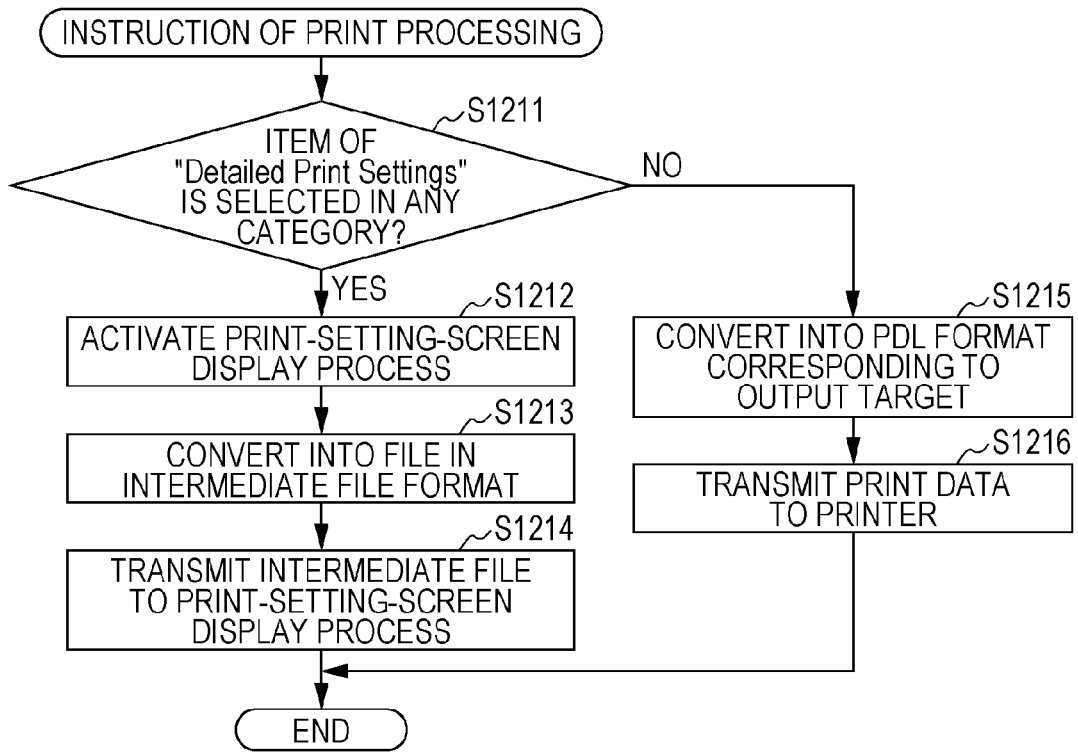
FIG. 11B is a flowchart showing an example of print processing according to the second embodiment of the present invention.

Processing when the print setting information 3012 is set from the print setting screen in FIG. 12 is described with reference to the flowchart in FIG. 11B.

This flowchart relates to processing in which, when the option of "Detailed Print Settings" in any certain category is selected, the printer driver 1052 activates the additional process and displays the print setting screen in FIG. 10 in the desktop UI environment.

This flowchart starts when the printer driver 1052 receives the instruction for execution of print processing from the application 1051. More specifically, the processing starts when "Print" button is pressed in the screen in FIG. 7A.

When the printer driver 1052 receives the instruction for execution of print processing from the application 1051, the printer driver 1052 determines whether or not the option of "Detailed Print Settings" in any category is selected (step S1211). If the option of "Detailed Print Settings" is selected as the result of the determination (YES in step S1211), the printer driver 1052 activates the print-setting-screen display process that is the additional process (step S1212). Steps S1213 to S1216 are equivalent to steps S903 to S906 described in the first embodiment.

By performing the above-described processing, the UI environment is switched to the desktop UI environment only when the user selects "Detailed Print Settings" on the print setting screen activated from the touch-panel UI environment. After that, since the desktop environment displays the print setting screen in FIG. 10 on which the print setting information 3012 equivalent to that of the printer driver 1052 can be set, the problem, in which the UI environment is unnecessarily switched to the desktop UI environment, can be addressed.

Third Embodiment

According to the second embodiment, the UI environment can be switched to the desktop UI environment only when it is intended by the user. However, there may be problems, in which the user has difficulty in finding the option, and when the option of "Detailed Print Settings" is selected, the optional item of that category is not indicated.

Figure 13:
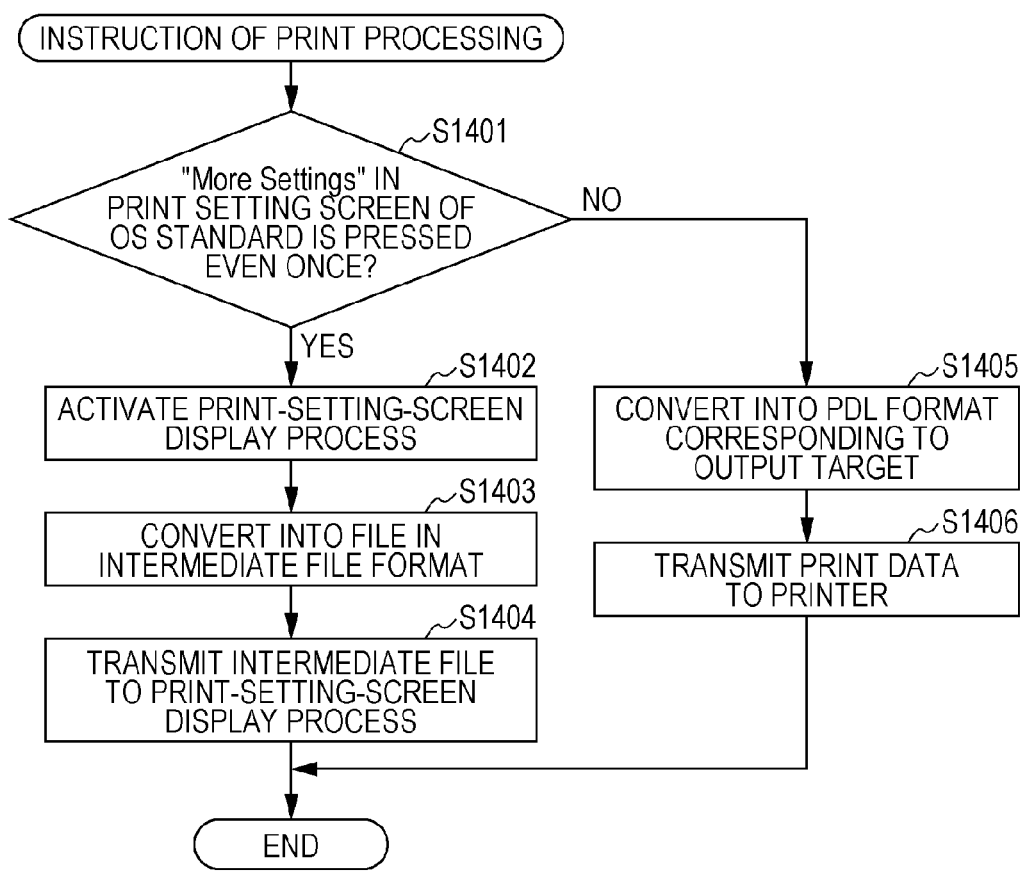
FIG. 13 is a flowchart showing an example of print processing according to a third embodiment of the present invention.

A configuration for addressing the problems is described with reference to a flowchart in FIG. 13.

This flowchart relates to processing for switching the touch-panel UI environment to the desktop UI environment, if "More Settings" link 805 on the print setting screen, which is generated by the operating system 1053 in response to the instruction for execution of print setting from the application 1051 that operates under the touch-panel UI environment, is clicked even once.

This flowchart starts when the printer driver 1052 receives an instruction for execution of print processing from the application 1051. More specifically, the processing starts when "Print" button is pressed in the screen 801 in FIG. 7A.

When the printer driver 1052 receives the instruction for execution of print processing from the application 1051, the printer driver 1052 determines whether or not the "More Settings" link 805 is clicked even once (step S1401). The following method is an example method of determining whether or not the "More Settings" link is clicked. This is a determining method by comparing the name of a process to be activated is different compared to the print setting screen in FIG. 7A activated by the application 1051. The print setting screen in FIG. 7B displayed when the "More Settings" link is clicked on the screen in FIG. 7A. If the printer driver 1052 recognizes that the process name of the printer driver 1052 is changed as the result of that the "More Settings" link 805 is clicked, the printer driver 1052 sets a flag or the like in a specific region of the print setting, such as the DEVMODE. When "Print" button in FIG. 7A is pressed, the printer driver 1052 recognizes the presence of the flag of the DEVMODE, and hence the printer driver 1052 can determine whether or not the "More Settings" link 805 is clicked even once. If the "More Settings" link 805 is clicked even once as the result of the determination (YES in step S1401), the printer driver 1052 activates the print-setting-screen display process that is the additional process (step S1402). Steps S1403 to S1406 are equivalent to steps S903 to S906 described in the first embodiment. Hence, the description is omitted.

With the above-described processing performed, the UI environment is switched to the desktop UI environment during printing only when the "More Settings" link 805 on the print setting screen in FIG. 7A is clicked. Accordingly, the print setting screen in FIG. 10 that can set the print setting information 3012 equivalent to that of the printer driver 1052 is displayed in the desktop UI environment only in case the user desires to set the print setting information 3012 in more detail.

Also, if the UI environment is switched to the desktop UI environment by the processing of this application 1051 while the user performs a touch operation with the touch-panel UI environment and if the processing is ended although execution of printing is instructed in FIG. 10, the user has to manually restore the desktop UI environment to the former touch-panel UI environment. Processing for reducing such troublesome operation of the user is described below.

First, as the preposition, the printer driver 1052 writes information about the application 1051 that instructs printing, in print setting information of a temporary spool file 207.

Then, the desktop module determines whether or not the application information written in the acquired temporary spool file 207 is included in a current process list. If the application information is included in the current process list, the desktop module gives an instruction to display the UI of the application 1051 written in the temporary spool file 207 on the most front surface.

Accordingly, even when the UI environment is shifted from the touch-panel UI environment to the desktop UI environment by the processing of this application 1051, the application 1051 can be returned to the former touch-panel application 1051.

With the present invention, the print setting information 3012 desired by the user can be set when printing is performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-020064, filed Feb. 1, 2012 which is hereby incorporated by reference herein in its entirety.

What is claimed is:

1. An information processing apparatus, comprising:
a processor and memory to perform:
an activating unit, in a case where an application for issuing a print instruction performed by using a first print setting screen for setting print setting information is an application which operates in a first environment suitable for a touch panel, and a print instruction setting, which is not allowed to be set through the first print setting screen provided by the application, is selected, configured to newly activate software that operates in a second environment which is different from the first environment; and
a display controlling unit configured to display a second print setting screen for the print setting information to the second environment,
wherein, in a case where the activating unit newly activates the software, the first environment is changed to the second environment,
wherein, in a case where an application for issuing a print instruction performed by using the first print setting screen is the application which operates in the first environment suitable for a touch panel, and a print instruction setting, which is not allowed to be set through the first print setting screen provided by the application, is not selected, the software that operates in the second environment which is different from the first environment is not activated, and
wherein the print instruction setting, which is not allowed to be set through the first print setting screen, can be set through the second print setting screen.

2. The information processing apparatus according to claim 1, wherein, in case an instruction for displaying a further detailed print setting item is input on a print setting screen provided by an operating system for the application that operates in the first environment, the activating unit newly activates the software that operates in the second environment which is different from the used first environment.

3. The information processing apparatus according to claim 1, further comprising a generating unit configured to generate print data based on the print setting information received through the print setting screen displayed in the second environment.

4. The information processing apparatus according to claim 1, wherein a specific platform of an operating system provides the first environment and a platform of the operating system different from the specific platform provides the second environment.

5. The information processing apparatus according to claim 1, further comprising a display controlling unit, in case the application, issuing the print instruction, operates in the second environment, the display controlling unit being configured to display another print setting screen which is different from a print setting screen in the first environment.

6. The information processing apparatus according to claim 1, further comprising a generation unit configured to generate print data based on print setting information received through the first print setting screen or the second print setting screen which is provided by the application.

7. A control method performed in an information processing apparatus which includes a processor and memory, the method comprising:
in a case where an application for issuing a print instruction performed by using a first print setting screen for setting print setting information is an application which operates in a first environment suitable for a touch panel, and a print instruction setting, which is not allowed to be set through the first print setting screen provided by the application, is selected, newly activating software that operates in a second environment which is different from the first environment; and
displaying a second print setting screen for setting the print setting information to the second environment,
wherein, in a case where the activating the software is activated, the first environment is changed to the second environment,
wherein, in a case where an application for issuing a print instruction performed by using the first print setting screen is the application which operates in the first environment suitable for a touch panel, and a print instruction setting, which is not allowed to be set through the first print setting screen provided by the application, is not selected, the software that operates in the second environment which is different from the first environment is not activated, and
wherein the print instruction which is not allowed to be set through the first print setting screen, can be set through the second print setting screen.

8. The control method according to claim 7, wherein, in case an instruction for displaying a further detailed print setting item is inputted on a print setting screen provided by an operating system for the application operating in the first environment, the activating newly activates the software operating in the second environment which is different from the first environment.

9. The control method according to claim 7, further comprising generating for generating print data based on the print setting information received through the print setting screen displayed in the second environment.

10. The control method according to claim 7, wherein a specific platform of an operating system provides the first environment and a platform of the operating system different from the specific platform provides the second environment.

11. The control method according to claim 7, further comprising display-controlling, in case the application which issued the print instruction operates in the second environment, the display-controlling displaying another print setting screen which is different from a print setting screen in the first environment.

12. A non-transitory recording medium storing a computer-readable program that causes a computer to execute a control method on an information processing apparatus, the control method comprising:
in a case where an application for issuing a print instruction performed by using a first print setting screen for setting print setting information is an application which operates in a first environment suitable for a touch panel, and a print instruction setting, which is not allowed to be set through the first print setting screen provided by the application, is selected, newly activating software that operates in a second environment which is different from the first environment; and displaying a second print setting screen for setting the print setting information to the second environment, wherein, in a case where the activating the software is activated, the first environment is changed to the second environment, wherein, in a case where an application for issuing a print instruction performed by using the first print setting screen is the application which operates in a first environment suitable for a touch panel, and a print instruction setting, which is not allowed to be set through the first print setting screen provided by the application, is not selected, the software that operates in the second environment which is different from the first environment is not activated, and wherein the print instruction which is not allowed to be set through the first print setting screen, can be set through the second print setting screen.

13. The recording medium according to claim 12, wherein, in case an instruction for displaying a further detailed print setting item is inputted on a print setting screen provided by an operating system for the application operating in the first environment, the activating newly activates the software operating in the second environment which is different from the first environment.

14. The recording medium according to claim 12, the control method further comprising generating for generating print data based on the print setting information received through the print setting screen displayed in the second environment.

15. The recording medium according to claim 12, wherein a specific platform of an operating system provides the first environment and a platform of the operating system different from the specific platform provides the second environment.

16. The recording medium according to claim 12, the control method further comprising display-controlling, in case the application which issued the print instruction operates in the second environment, the display-controlling displaying another print setting screen which is different from a print setting screen in the first environment.

* * * * *